United States Patent
Karabulut et al.

(10) Patent No.: US 12,273,446 B2
(45) Date of Patent: Apr. 8, 2025

(54) SIMPLIFIED MASKING FOR SIGNED CRYPTOGRAPHY OPERATIONS

(71) Applicant: Microsoft Technology Licensing, LLC, Redmond, WA (US)

(72) Inventors: Emre Karabulut, Raleigh, NC (US); Bharat S. Pillilli, El Dorado Hills, CA (US); Mojtaba Bisheh Niasar, Ithaca, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 240 days.

(21) Appl. No.: 18/109,057

(22) Filed: Feb. 13, 2023

(65) Prior Publication Data
US 2024/0137216 A1 Apr. 25, 2024

Related U.S. Application Data (60) Provisional application No. 63/418,168, filed on Oct. 21, 2022.

(51) Int. Cl.
*H04L 9/08* (2006.01)
*H04L 9/30* (2006.01)
(Continued)

(52) U.S. Cl.
CPC .......... *H04L 9/0869* (2013.01); *H04L 9/3033* (2013.01); *H04L 9/3252* (2013.01);
(Continued)

(58) Field of Classification Search
CPC ....... H04L 9/0869; H04L 9/08; H04L 9/3033; H04L 9/003; H04L 9/0662;
(Continued)

(56) References Cited

U.S. PATENT DOCUMENTS

2008/0273694 A1* 11/2008 Ebeid ...................... G06F 7/725
380/28
2018/0351729 A1* 12/2018 Tunstall .................. H04L 9/003
(Continued)

FOREIGN PATENT DOCUMENTS

EP 2119103 B1 10/2013

OTHER PUBLICATIONS

Jude Ambrose, Darns: A Random Multi-modulo RNS Architecture for Double-and-Add in ECC to prevent Power Analysis Side Channel Attacks, pp. 620-625 (Year: 2013).*

(Continued)

*Primary Examiner* — Shaqueal D Wade-Wright
(74) *Attorney, Agent, or Firm* — Schwegman Lundberg & Woessner, P.A.

(57) ABSTRACT

Generally discussed herein are devices, systems, and methods for secure cryptographic masking. A method can include generating a first random number, determining a result of the first random number modulo a prime number resulting in a second random number, subtracting the second random number from the prime number resulting in a first subtraction result, adding a private key value to the first subtraction result resulting in a first split, and responsive to determining the private key value is less than the random number, providing the first split and the second random number as splits of the private key.

20 Claims, 5 Drawing Sheets

(51) Int. Cl.
*H04L 9/32* (2006.01)
*H04L 9/00* (2022.01)
*H04L 9/06* (2006.01)

(52) U.S. Cl.
CPC ............ *H04L 9/003* (2013.01); *H04L 9/0662* (2013.01); *H04L 2209/04* (2013.01)

(58) Field of Classification Search
CPC ... H04L 2209/04; H04L 9/3252; G06F 21/71; G06F 21/556; G06F 21/75; G06F 21/755
See application file for complete search history.

(56) References Cited

U.S. PATENT DOCUMENTS

2021/0028931 A1* 1/2021 Ng ........................... H04L 9/085
2021/0409208 A1* 12/2021 Barbu ..................... G06F 7/764

OTHER PUBLICATIONS

International Search Report and Written Opinion received for PCT Application No. PCT/US23/031937, mailed on Nov. 30, 2023, 14 pages.
Tunstall, et al., "Boolean Exponent Splitting", International Association for Cryptologic Research, Dec. 21, 2018, 22 pages.

* cited by examiner

SIMPLIFIED MASKING FOR SIGNED CRYPTOGRAPHY OPERATIONS

RELATED APPLICATION

This application claims the benefit of priority to United States Provisional Patent Application 63/418,168 titled "Low-Cost, High-Security Solutions for Digital Signature Algorithm" and filed on Oct. 21, 2022, which is incorporated herein by reference in its entirety.

BACKGROUND

Side-Channel Analysis (SCA) attacks pose a significant threat to the security of cryptographic implementations because they exploit some information (e.g., power consumption or electromagnetic radiation) that can be observed from the execution of an algorithm on a device to recover the secret key. Countermeasures try to reduce the correlation between the targeted secret and captured side-channel measurement. Each known countermeasure, however, adds overhead costs to a cryptography system design. The overhead can include increased power consumption, increased time to generate a key, sign a message, or verify a key, increased circuitry footprint, among others.

A formal approach to mitigate multi-trace SCA is to mask the implementation. Masking includes splitting operations that are typically performed in a single instruction to a mathematical equivalent that is performed in multiple instructions. Masking has a considerable overhead, affecting area, power consumption, latency, and/or throughput by a factor of two or three at least. Boolean masking, for example, increases the cost by around five (5) times.

SUMMARY

A device, system, method, and computer-readable medium configured for improved masking operations are provided. Masking operations are improved by eliminating a sign bit typically used in performing a masking operation. By eliminating the sign bit, a probing attack that can determine a key value based on a distribution of positive and negative occurrences on the sign bit is eliminated. The sign bit is eliminated by altering an order of operations performed during encryption. The change in order of operations ensures that relevant results of the masking operations are always positive.

A method for masking operation security in a cryptographic technique can include generating a first random number. The method can include determining a result of the first random number modulo a prime number resulting in a second random number. The method can include subtracting the second random number from the prime number resulting in a first subtraction result. The method can include adding a private key value to the first subtraction result resulting in a first split. The method can include responsive to determining the private key value is less than the random number, providing the first split and the second random number as splits of the private key.

The method can include subtracting the second random number from the private key resulting in a second split. The method can include providing, by a multiplexer, the second split and the second random number as splits of the private key responsive to determining the private key value is less than or equal to the random number. The first split can be provided by the multiplexer.

The method can include comparing, by a comparator, the private key value to the second random number. The method can include selecting, by output of the comparator, whether the first split or the second split is provided by the multiplexer. In performing the method, operators that provide input to the multiplexer can be constrained to provide relevant values that are strictly positive.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

Embodiments enable creating an arithmetic masking for signed arithmetic operation without performing Boolean masking over arithmetic operations. Embodiments use a modulus reduction method that prevents a leakage on the sign-bit unlike other solutions. Embodiments achieve this by removing the sign bit altogether. The sign bit is removed by adjusting cryptographic operations performed without changing the overall security and results of the cryptographic operations.

Figure 1:
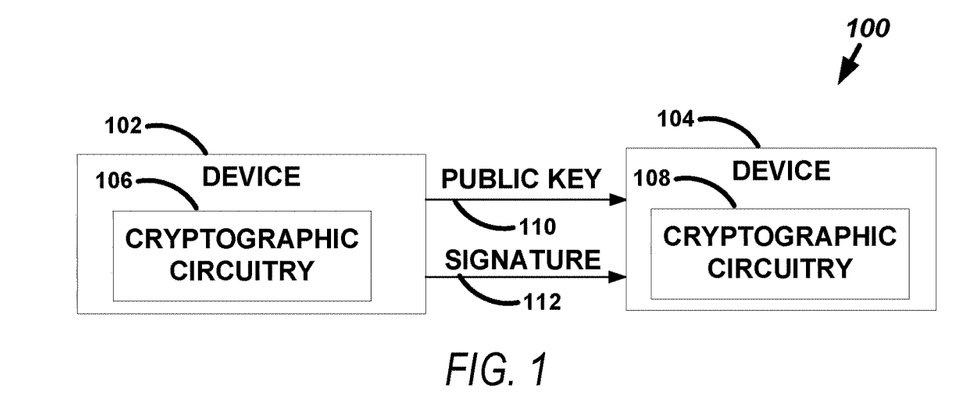
FIG. 1 illustrates, by way of example, a diagram of an embodiment of a system that includes a signing device and a verifying device.

FIG. 1 illustrates, by way of example, a diagram of an embodiment of a system 100 that includes a signing device 102 and a verifying device 104. The signing device 102 includes cryptographic circuitry 106 that uses cryptographic techniques to provide verification that the device 102 is authentic. The cryptographic circuitry 106, 108 can implement a DSA technique, such as ECDSA or another DSA technique. The devices 102, 104 can include any devices for which identity verification is performed or possible. Such devices include components of a computer or the computer itself (e.g., a laptop computer, smartphone, desktop computer, smart appliance, vehicle, or the like).

ECDSA does the same thing as any other digital signing signature, but more efficiently. This is due to ECDSA's use of smaller keys to create the same level of security as any other digital signature algorithm. ECDSA can be used to create ECDSA certificates, which is a type of electronic document used for authentication of the owner of the certificate. Certificates contain information about the key used to create the certificate, information about the owner of the certificate, and the signature of the issuer of the certificate, who is a verified trusted entity. This trusted issuer is normally a certificate authority which also has a signed certificate, which can be traced back through the chain of trust to the original issuing certificate authority.

The way ECDSA works is that an elliptic curve is analyzed, and a point on the curve is selected. That point is multiplied by another number, thus creating a new point on the curve. The new point on the curve is very difficult to find, even with the original point at your disposal. The complexity of ECDSA means that ECDSA is more secure against current methods of encryption cracking encryptions. Along with being more secure against current attack methods, ECDSA also offers a variety of other benefits as well.

A summary of standards ECDSA is provided. Suppose client 1 wants to send a signed message to client 2. Initially, they must agree on parameters (C, G, n) of a curve. C is the elliptic curve field and equation, G is a base point on the elliptic curve, and n is the integer order of G. n is prime and referred to as "p" below. Client 1 creates a key pair comprising a private key less than n, and a public key curve point, Q, that is the private key×G, where "x" represents elliptic curve point multiplication by a scalar. Then client 1 signs the message by:

(i) generating a hash of the message;
(ii) select an ephemeral key, k, where k is less than n;
(iii) determine a curve point k×G;
(iv) calculate r=(x-value of curve point from (iii) mode n);
(v) calculate s=$k^{-1}$ ((most significant bits (same number of bits as n) of hash of message)+r*private key) mod n; and
(vi) provide signature (r, s)

The signing device 102 generates a public and private key pair and signs a communication using the private key. The verifying device 104 performs computations on the signature to assure that the signing device 102 is indeed the device that issued the communication. Each of the generating the key, signing the communication, and verifying the key are performed by the cryptographic circuitry 106, 108. The device 102 generates a public key 110 and a private key pair. The device 102 signs communications by encrypting a message using a private key. The public key 110 can be used to decrypt the communication, the signature 112, or a combination thereof. The signature 112 can include a hash of contents of the communication and the hash of the communication can be encrypted using the private key.

A key generation algorithm has two steps of operations. First, the key generation algorithm employs a random number generator, such as a hash-based message authentication code (HMAC) deterministic random bit generator (DRBG) engine, to generate a private key. The private key is then used to generate the public key 110. The public key 110 generation operation consists of multiplication, called scalar multiplication. The operands of the multiplication are a private key and a known value. Key generation does not pose a threat for multi-trace attacks. The key generation is subject to a single-trace attack including simple-power-analysis (SPA) and horizontal power attacks.

A signing algorithm includes the same steps as a key generation algorithm but has additional operations. The additional operations are modular integer multiplications and additions. The modular multiplications and additions possess multiple side-channel threats.

A verifying algorithm works with public values and thus it does not possess a SCA attack threat.

Embodiment uses an efficient masking approach to address the issue. Masking randomizes the intermediate values of an implementation by splitting them into two or more "shares" that are processed independently and when added later return the expected value.

In the DSA algorithm, there are two secret values, an ephemeral key, k, and a private key, which are used in the signing routine. If masking was performed using both k and the private key, then the design cost would approximately increase by at least ten (10) times in modular integer operations, which in turn increases a cost in terms of area, power and potentially making the design time convergence worse.

Figure 2:
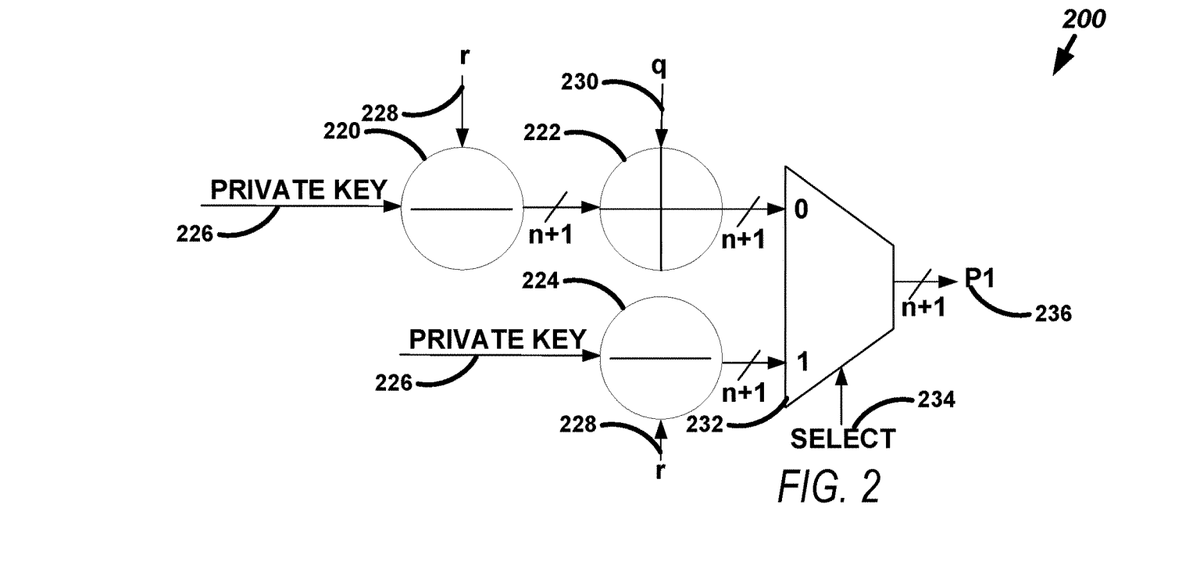
FIG. 2 illustrates, by way of example, a diagram of an embodiment of a cryptographic circuit that uses masking for cryptography security.

FIG. 2 illustrates, by way of example, a diagram of an embodiment of a cryptographic circuit 200 that uses masking for cryptography security. The cryptographic circuit 200 performs a masking operation on the private key 226. The masking operation randomizes intermediate values of a cryptographic technique by splitting an intermediate value into two or more shares that are processed independently. The circuit 200 as illustrated includes a modular subtractor 220, modular adder 222, a modular subtractor 224, and a multiplexer 232. The modular subtractors 220, 224 both determine a difference between the private key 226 and the random number, r 228 modulo some prime number q. The modular adder 222 adds a prime number, q 230, to the result of the subtractor 220 resulting in the value private key-r+q and then determines the result modulo the prime number q.

Assume there is a random value, r 228, that is used to split a private value (sometimes called a "private key" 226), P, into two shares, P1 236 and P2. P1 236 is P−r (or P−r+q), while P2 is r 228. An attacker does not realize a bias on P by probing the P1 236 and P2 traces because the random number, r 228, provides a randomness on P. Since all operations are modulus a prime number, q 230, whose bit length is n, a reduction is performed when P1 236 and P2 are generated. n is a positive integer. Random number, r 228, can range only between 0 and q−1, so P2 does not require a reduction. However, P1 236 requires an additional effort due to the subtraction between the P and r 228. Note that P1 236 also ranges between 0 and q−1. If P−r is less than 0, the operation requires an add operation with q 230. Therefore, the negative P−r values become (P−r)+q. Since P and r range between 0 and q−1, the result of P−r requires n+1 bits where (n+1)th bit represents the sign bit.

The multiplexer 232 can be controlled by a select line 234. A result of a comparator can be used to control the select line 234. The comparator can compare P and r. If P<r, the select line 234 can be zero (0) and P−r+q can be provided as P1 236. If P>r, the select line 234 can be one (1) and P−r can be provided as P1 236.

A sign bit indicates whether a value of a number is positive or negative. Typically, a zero represents a positive number, while a value of one represents a negative number. Negative logic can also be used. The sign bit is typically the most significant bit of a number but can represented by the least significant bit of a number.

Figure 3:
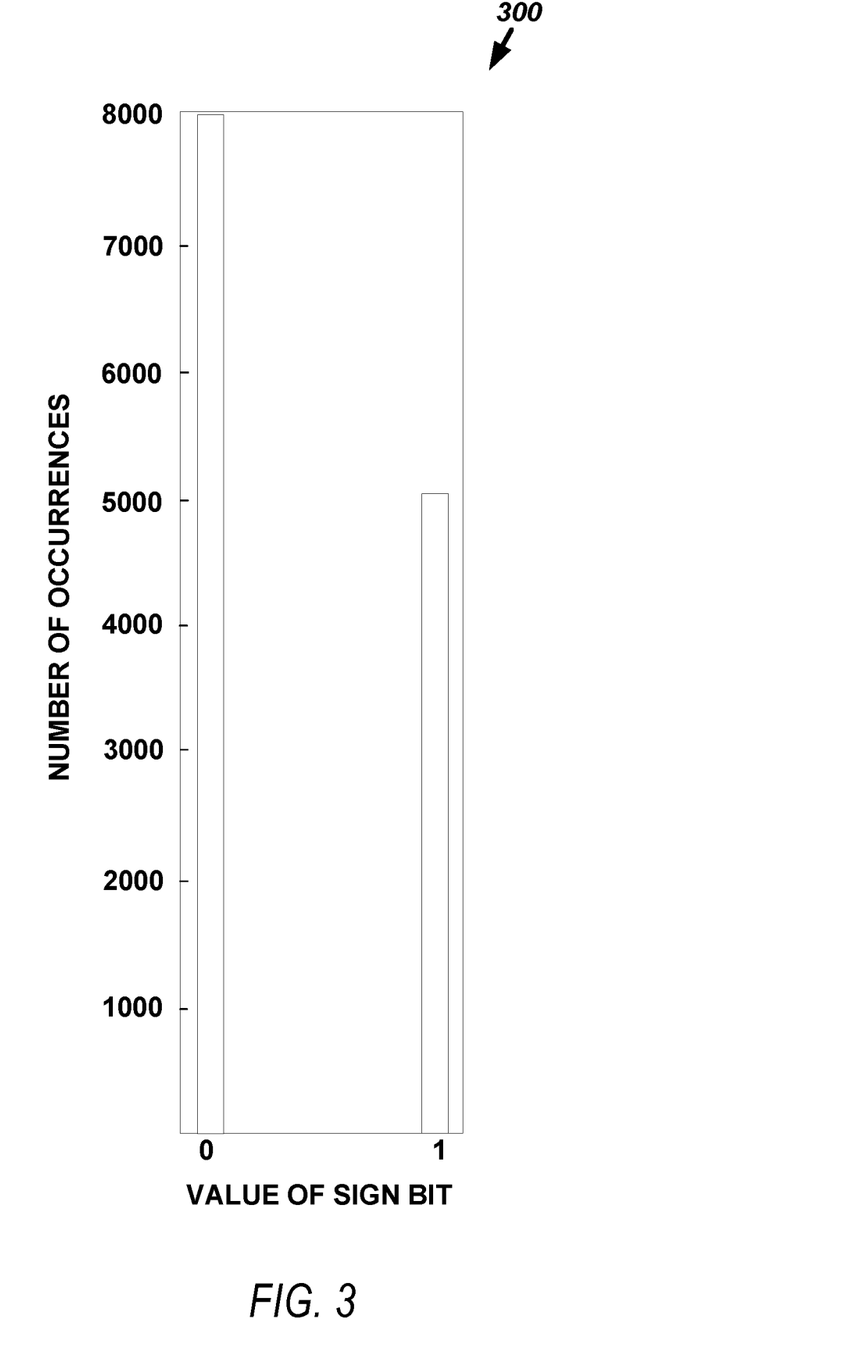
FIG. 3 illustrates, by way of example, results of a simulation on a sign bit.

FIG. 3 illustrates, by way of example, a graph 300 of results of a simulation on a sign bit (e.g., the most significant bit of the operation of the subtractor 220 of the circuit 200). The graph in FIG. 3 shows a value obtained by probing the sign bit line and the number of times that value was realized. In the example of FIG. 3, 13,000 samples were obtained. If an attacker were to probe just the sign bit and record the value of the sign bit, they might come up with the graph shown in FIG. 3. Using the distribution of the value obtained from probing only the sign bit of the circuit 200, the attacker would be able to deduce the private key.

For the simulation of FIG. 3, prime number, q 230, was assumed to be 13, and the private key 226 is assumed to be 7. The random number is randomly chosen in the range [0, q−1]. Since 7 is closer to 13 than 0, the number of times the sign bit is one (indicating that P<r and P−r is thus negative), is fewer than the number of times the sign bit is 0. The disparity between the number of times the sign bit is one and the number of times the sign bit is zero is enough information to indicate the private key or at least greatly reduce the possible values of the private key. This is because the masking operation performed using the circuit 200 exposes the private key 226 to the comparison and requires an additional bit for operation.

The sign bit leakage is important especially when an attacker can probe shared lines (e.g., a comparator output). This attack method is called a probing attack. Prior works have shown, for example, that Peripheral Component Interconnect express (PCIe) or the memory encryption units can be probed and are attackable due to the nature of off-chip structures even though they have crypto protection. Therefore, designers should consider every output as probable when the design goal is to provide masking level protection. Embodiments provide security against probing attacks, such as that described regarding FIGS. 2 and 3.

Figure 4:
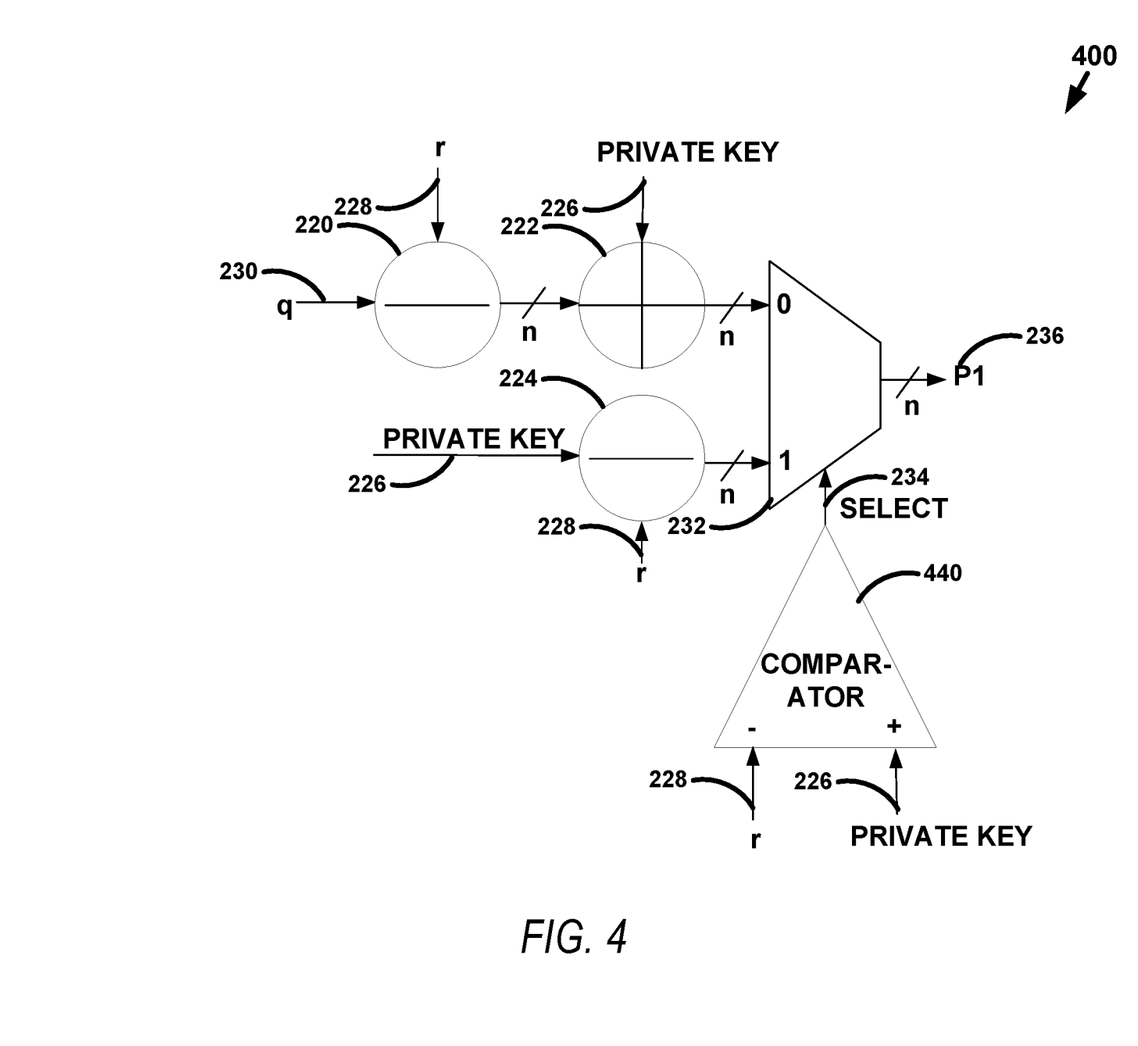
FIG. 4 illustrates, by way of example, a diagram of a circuit for cryptography with improved masking security.

FIG. 4 illustrates, by way of example, a diagram of a circuit 400 for cryptography with improved masking security. The circuit 400 overcomes the probing vulnerabilities realized by the masking in the circuit 200. The circuit 400 is different from the circuit 200 in that the circuit 400 does not require a sign bit. A compare operation is still performed (by a comparator 440). However, the subtractor 220, instead of subtracting r 228 from the private key 226 as in the circuit 200, instead subtracts the random number, r 228, from the prime number, q 230. Since r 228 is guaranteed to be less than q 230, the result of the subtractor 220 (r−q) is guaranteed to be positive. The select line 234, when P<r selects the result of the adder 222, which is the same in both circuits 200 and 400. In the circuit 200, the adder 222 returns P−r+q which is equivalent to what the adder 222 returns in the circuit 400 (q−r+P). When the private key 226 is greater than r 228, the select line 234 selects P1 236 as P−r (the same as in the circuit 200).

The circuit 400 first performs a subtraction between q 230 and r 228. Since it is known that r 228 cannot be greater than q 230, a signed arithmetic operation is not needed. Thus, the output length will be n bits instead of n+1 bits. Also, q−r is smaller than q−P if r is greater than P. Moreover, if the r is greater than P, it is known that the P−r will be a negative number so adding q cannot exceed the n bit-length. Therefore, ((q−r)+P) cannot exceed the n bit-length. Further yet, (q−r)+P can exceed the n bit-length if only if P is greater than r. Although the $1^{st}$ option output will be incorrect in the case where P is greater than r, the mux will choose the "1" option in this case, thus the additional bit remains irrelevant and is not needed.

If the "1" option is selected, the result of P−r cannot be larger than n bit-length. P−r can be larger than the n bit-length if and only if the "0" option is selected in which case, the output of the subtractor 224 is irrelevant.

Note that the comparator 440 operations can be masked using Boolean masking. This is not additional work, as the circuit 200 can also benefit from the Boolean masking. A benefit of the circuit 400 is that the sign bit is eliminated, thus the probing attack vulnerability is removed.

Although the circuit 400 prevents the leakage caused by the arithmetic operation of the circuit 200. Comparing P and r and then selecting using the mux still causes a leakage because of the non-linear operational nature of comparison. This issue is not unique for the circuit 400. Solving this problem can be solved using Boolean masking. Although Boolean masking can be used for the comparison, the remaining part supports arithmetic masking without leaking the signed-bit. Hence, the circuit 400 outperforms the circuit 200.

Figure 5:
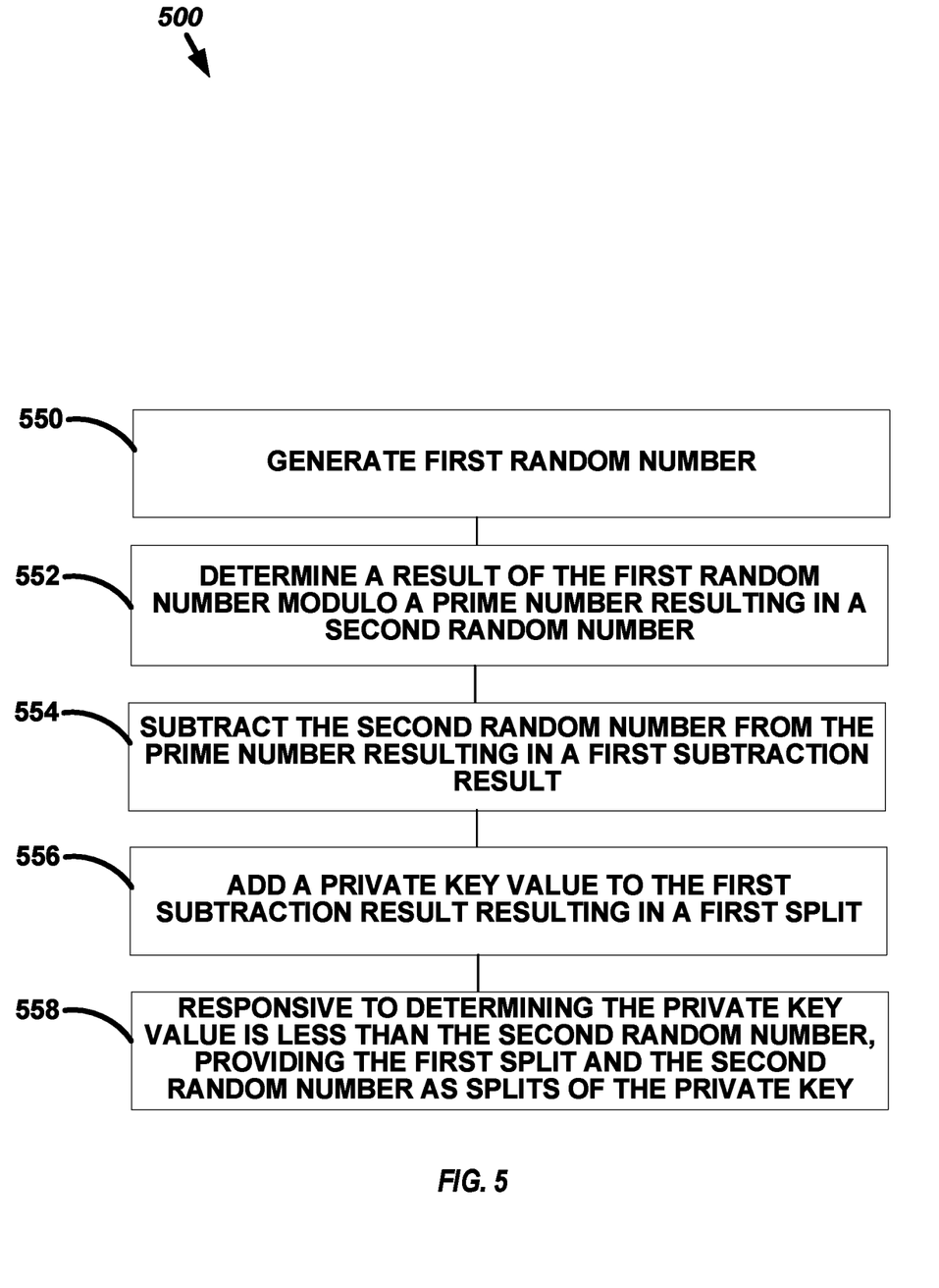
FIG. 5 illustrates, by way of example, a diagram of an embodiment of a method for cryptographic masking operation security.

FIG. 5 illustrates, by way of example, a diagram of an embodiment of a method 500 for cryptographic masking operation security. The method 500 as illustrated includes generating a first random number, at operation 550; determining a result of the first random number modulo a prime number resulting in a second random number, at operation 552; subtracting the second random number from the prime number resulting in a first subtraction result, at operation 554; adding a private key value to the first subtraction result resulting in a first split, at operation 556; and responsive to determining the private key value is less than the second random number, providing the first split and the first or second random number as splits of the private key, at operation 558.

The method 500 can further include subtracting the second random number from the private key resulting in a second split. The method 500 can further include providing, by a multiplexer, the second split and the second random number as splits of the private key responsive to determining the private key value is less than or equal to the second random number. The method 500 can further include, wherein the first split is provided by the multiplexer. The method 500 can further include comparing, by a comparator, the private key value to the second random number. The method 500 can further include selecting, by output of the comparator, whether the first split or the second split is provided by the multiplexer. The method 500 can further include, wherein operators that provide input to the multiplexer are constrained to provide values that are strictly positive.

Figure 6:
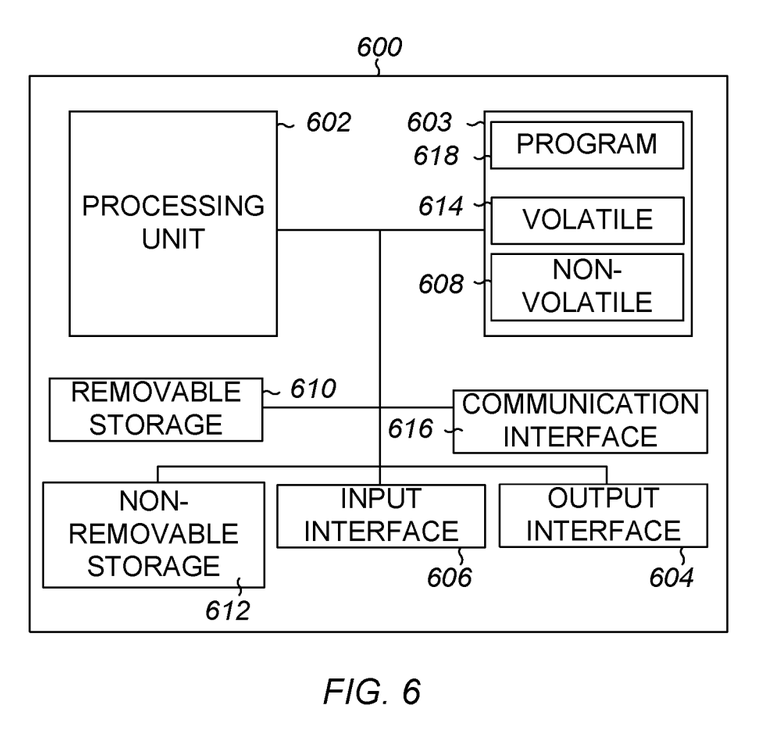
FIG. 6 illustrates, by way of example, a block diagram of an embodiment of a machine (e.g., a computer system) to implement one or more embodiments.

FIG. 6 illustrates, by way of example, a block diagram of an embodiment of a machine 600 (e.g., a computer system) to implement one or more embodiments. One or more of the device 102, 104, cryptographic circuitry 106, 108, adder 222, subtractor 220, 224, circuit 200 or 400, or method 500 or a component or operations thereof can be implemented, at least in part, using a component of the machine 600. One example machine 600 (in the form of a computer), may include a processing unit 602, memory 603, removable storage 610, and non-removable storage 612. Although the example computing device is illustrated and described as machine 600, the computing device may be in different forms in different embodiments. For example, the computing device may instead be a smartphone, a tablet, smartwatch, or other computing device including the same or similar elements as illustrated and described regarding FIG. 6. Devices such as smartphones, tablets, and smartwatches are generally collectively referred to as mobile devices. Further, although the various data storage elements are illustrated as part of the machine 600, the storage may also or alternatively include cloud-based storage accessible via a network, such as the Internet.

Memory 603 may include volatile memory 614 and non-volatile memory 608. The machine 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 600 may include or have access to a computing environment that includes input 606, output 604, and a communication connection 616. Output 604 may include a display device, such as a touchscreen, that also may serve as an input component. The input 606 may include one or more of a touchscreen, touchpad, mouse, keyboard, camera, one or more device-specific buttons, one or more sensors integrated within or coupled via wired or wireless data connections to the machine 600, and other input components. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 602 (sometimes called processing circuitry) of the machine 600. A hard drive, CD-ROM, and RAM are some examples of articles including a non-transitory computer-readable medium such as a storage device. For example, a computer program 618 may be used to cause processing unit 602 to perform one or more methods or algorithms described herein.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on processing circuitry, such as can include a digital signal processor, ASIC, microprocessor, central processing unit (CPU), graphics processing unit (GPU), field programmable gate array (FPGA), or other type of processor operating on a computer system, such as a personal computer, server, or other computer system, turning such computer system into a specifically programmed machine. The processing circuitry can, additionally or alternatively, include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like). The terms computer-readable medium, machine readable medium, and storage device do not include carrier waves or signals to the extent carrier waves and signals are deemed too transitory.

Additional Notes and Examples

Example 1 includes a method for cryptography security, the method comprising generating a first random number, determining a result of the first random number modulo a prime number resulting in a second random number, subtracting the second random number from the prime number resulting in a first subtraction result, adding a private key value to the first subtraction result resulting in a first split, and responsive to determining the private key value is less than the second random number, providing the first split and the first or second random number as splits of the private key.

In Example 2, Example 1 further includes subtracting the second random number from the private key resulting in a second split.

In Example 3, Example 2 further includes providing, by a multiplexer, the second split and the second random number as splits of the private key responsive to determining the private key value is less than or equal to the second random number.

In Example 4, Example 3 further includes, wherein the first split is provided by the multiplexer.

In Example 5, Example 4 further includes comparing, by a comparator, the private key value to the second random number.

In Example 6, Example 5 further includes selecting, by output of the comparator, whether the first split or the second split is provided by the multiplexer.

In Example 7, at least one of Examples 1-6 further includes, wherein operators that provide input to the multiplexer are constrained to provide values that are strictly positive.

In Example 8 a device is configured to implement the method of one of Examples 1-7.

In Example 9 a system is configured to perform the method of one of Examples 1-7.

Example 10 includes a computer-readable medium including instructions that, when executed by a machine, cause the machine to perform the method of one of claims 1-7.

Although a few embodiments have been described in detail above, other modifications are possible. For example, the logic flows depicted in the figures do not require the order shown, or sequential order, to achieve desirable results. The desirable for embodiments can include the user having confidence in the state of their data, settings, controls, and secrets before, during, and after a migration to a new version of an application. Using multiple factors to check data state, integrity, presence, and absence before and after the migration can increase confidence. Other steps may be provided, or steps may be eliminated, from the described flows, and other components may be added to, or removed from, the described systems. Other embodiments may be within the scope of the following claims.

What is claimed is:

1. A method for masking operation security in a cryptographic technique, the method comprising:
   generating a first random number;
   determining a result of the first random number modulo a prime number resulting in a second random number;
   subtracting the second random number from the prime number resulting in a first subtraction result;

adding a value of a private key to the first subtraction result resulting in a first split; and responsive to determining the private key value is less than the second random number, providing the first split and the second random number as splits of the private key.

2. The method of claim 1, further comprising subtracting the second random number from the private key resulting in a second split.

3. The method of claim 2, further comprising providing, by a multiplexer, the second split and the second random number as splits of the private key responsive to determining the private key value is less than or equal to the second random number.

4. The method of claim 3, wherein the first split is provided by the multiplexer.

5. The method of claim 4, further comprising comparing, by a comparator, the private key value to the second random number.

6. The method of claim 5, further comprising selecting, by output of the comparator, whether the first split or the second split is provided by the multiplexer.

7. The method of claim 6, wherein operators that provide input to the multiplexer are constrained to provide values that are strictly positive.

8. A cryptography device comprising:
processing circuitry; and
a memory including instructions that, when executed by the processing circuitry, cause the processing circuitry to perform operations for masking operation security of a cryptographic technique, the operations comprising:
generating a first random number;
determining a result of the first random number modulo a prime number resulting in a second random number;
subtracting the second random number from the prime number resulting in a first subtraction result;
adding a value of a private key to the first subtraction result resulting in a first split; and
responsive to determining the private key value is less than the second random number, providing the first split and the second random number as splits of the private key.

9. The device of claim 8, wherein the operations further comprise subtracting the second random number from the private key resulting in a second split.

10. The device of claim 9, wherein the operations further comprise providing, by a multiplexer of the processing circuitry, the second split and the second random number as splits of the private key responsive to determining the private key value is less than or equal to the second random number.

11. The device of claim 10, wherein the first split is provided by the multiplexer.

12. The device of claim 11, wherein the operations further comprise comparing, by a comparator of the processing circuitry, the private key value to the second random number.

13. The device of claim 12, wherein the operations further comprise selecting, by output of the comparator, whether the first split or the second split is provided by the multiplexer.

14. The device of claim 13, wherein operators that provide input to the multiplexer are constrained to provide values that are strictly positive.

15. A computer-readable medium including instructions that, when executed by a machine, cause the machine to perform operations for masking operation security in a cryptographic technique, the operations comprising:
generating a first random number;
determining a result of the first random number modulo a prime number resulting in a second random number;
subtracting the second random number from the prime number resulting in a first subtraction result;
adding a value of a private key value to the first subtraction result resulting in a first split; and
responsive to determining the private key value is less than the second random number, providing the first split and the second random number as splits of the private key.

16. The computer-readable medium of claim 15, wherein the operations further comprise subtracting the second random number from the private key resulting in a second split.

17. The computer-readable medium of claim 16, wherein the operations further comprise providing, by a multiplexer, the second split and the second random number as splits of the private key responsive to determining the private key value is less than or equal to the random number.

18. The computer-readable medium of claim 17, wherein the first split is provided by the multiplexer.

19. The computer-readable medium of claim 18, wherein the operations further comprise comparing, by a comparator, the private key value to the second random number.

20. The computer-readable medium of claim 19 wherein the operations further comprise selecting, by output of the comparator, whether the first split or the second split is provided by the multiplexer.

* * * * *